Oct. 2, 1962  J. B. JONES  3,056,192
VIBRATORY WELDING PROCESS AND APPARATUS
Filed Dec. 30, 1957  4 Sheets-Sheet 1

INVENTOR.
JAMES BYRON JONES
BY
Arthur H. Seidel
ATTORNEY.

INTERRELATION OF TENSILE-SHEAR STRENGTH, INPUT POWER,
AND ENERGY DELIVERED THROUGH THE WELD ZONE
IN ULTRASONIC WELDING OF 0.032-INCH 1100-H14 ALUMINUM

INTERRELATION OF TENSILE-SHEAR STRENGTH, INPUT POWER,
AND ENERGY DELIVERED THROUGH THE WELD ZONE
IN ULTRASONIC WELDING OF 0.040-INCH 1100-H14 ALUMINUM

INVENTOR
JAMES BYRON JONES
BY Arthur H. Seidel
ATTORNEY.

Oct. 2, 1962    J. B. JONES    3,056,192
VIBRATORY WELDING PROCESS AND APPARATUS
Filed Dec. 30, 1957    4 Sheets-Sheet 4

INTERRELATION OF TENSILE-SHEAR STRENGTH, INPUT POWER,
AND ENERGY DELIVERED THROUGH THE WELD ZONE
IN ULTRASONIC WELDING OF 0.064-INCH 1100-H14 ALUMINUM

INVENTOR
JAMES BYRON JONES
BY
Arthur H. Seidel
ATTORNEY.

United States Patent Office 3,056,192
Patented Oct. 2, 1962

3,056,192
VIBRATORY WELDING PROCESS AND APPARATUS
James Byron Jones, West Chester, Pa., assignor, by mesne assignments, to Sonobond Corporation, West Chester, Pa., a corporation of Pennsylvania
Filed Dec. 30, 1957, Ser. No. 705,875
9 Claims. (Cl. 29—407)

The present invention relates to a vibratory welding process and to vibratory welding apparatus. In particular, the present invention relates to a vibratory welding process in which the quality of the weldment may be ascertained during the welding process. This invention is also directed to vibratory welding apparatus for forming weldments of optimum strength characteristics.

Very recently, vibratory process and apparatus have been developed for the bonding of metals together. Thus, in such processes and by the use of such apparatus the contacting surfaces of the metals to be bonded are held under sufficient force to hold them together in firm contact at the intended weld interface and while the metals are so-retained elastic vibration, by which is meant vibration applied to the weldment by means of an elastic member, such as a metal rod, is applied to the weldment through a friction coupling or a positive drive coupling so as to produce either shear vibration or a combination of shear and compressive vibration at the interface being bonded. The aforesaid vibratory welding processes and apparatus have been described in patent applications filed in the name of James Byron Jones, William C. Elmore, and Carmine F. DePrisco, namely Serial No. 467,382 filed November 8, 1954 for "Method and Apparatus Employing Vibratory Energy for Bonding Materials," now abandoned; Serial No. 579,780 filed April 23, 1956 for "Method and Apparatus Employing Vibratory Energy for Bonding Metals," now Patent 2,946,119; Serial No. 579,779 filed April 23, 1956 for "Vibratory Seam Welder and Vibratory Seam Welding Process," now abandoned; and Serial No. 610,991 filed September 5, 1956 for "Method and Apparatus Employing Vibratory Energy for Bonding Metals" now Patent 2,985,954.

The disclosures of each of the above-identified patent applications is incorporated into the subject patent application and made a part hereof.

It is now discovered that it is possible to monitor the quality of the weldments in vibratory welding, and the present invention is directed to a process in which the quality of the weldments is maintained at an optimum level and to apparatus for effecting high quality weldments. Thus, the present invention relieves the user of the vibratory welding process from depending upon postwelding techniques for determining weld quality, such as visual inspection, chemical analysis, metallographic tests, magnetic particle inspection, fluorescent penetrant inspection, radiographic inspection, mechanical testing, trepanning sampling, sectioning, stethoscope inspection, and ultrasonic inspection.

It has now been discovered that the strength of the weldment, as reflected by its tensile shear strength is accurately reflected by the comparative magnitude of the vibratory energy delivered through the workpieces. Thus, when a vibratory welding unit is operating at a frequency appreciably different from its design frequency of operation, namely its resonant frequency, it has been found that the tensile-shear strength of the weldment formed by such unit is appreciably lower than by a unit which is operating at its design frequency, and that moreover the comparative magnitude of intensity of vibratory energy transmitted through the workpieces will reflect such variation of the frequency of operation.

This invention has as an object the provision of a novel vibratory welding process.

This invention has as another object the provision of a novel vibratory welding process in which monitoring of the weldment quality may be achieved.

This invention has as yet another object the provision of a vibratory welding process for producing weldments of optimum integrity and strength characteristics.

This invention has as still another object the provision of novel vibratory welding apparatus.

This invention has as yet another object the provision of vibratory welding apparatus capable of self-monitoring in respect to the strengths of the weldments produced by such apparatus.

This invention has as still another object the provision of vibratory welding apparatus capable of producing weldments having optimum strength characteristics.

Other objects will appear hereinafter.

For the purpose of illustrating the invention there is shown in the drawings a form which is presently preferred; it being understood, however, that this invention is not limited to the precise arrangements and instrumentalities shown.

Figure 1:
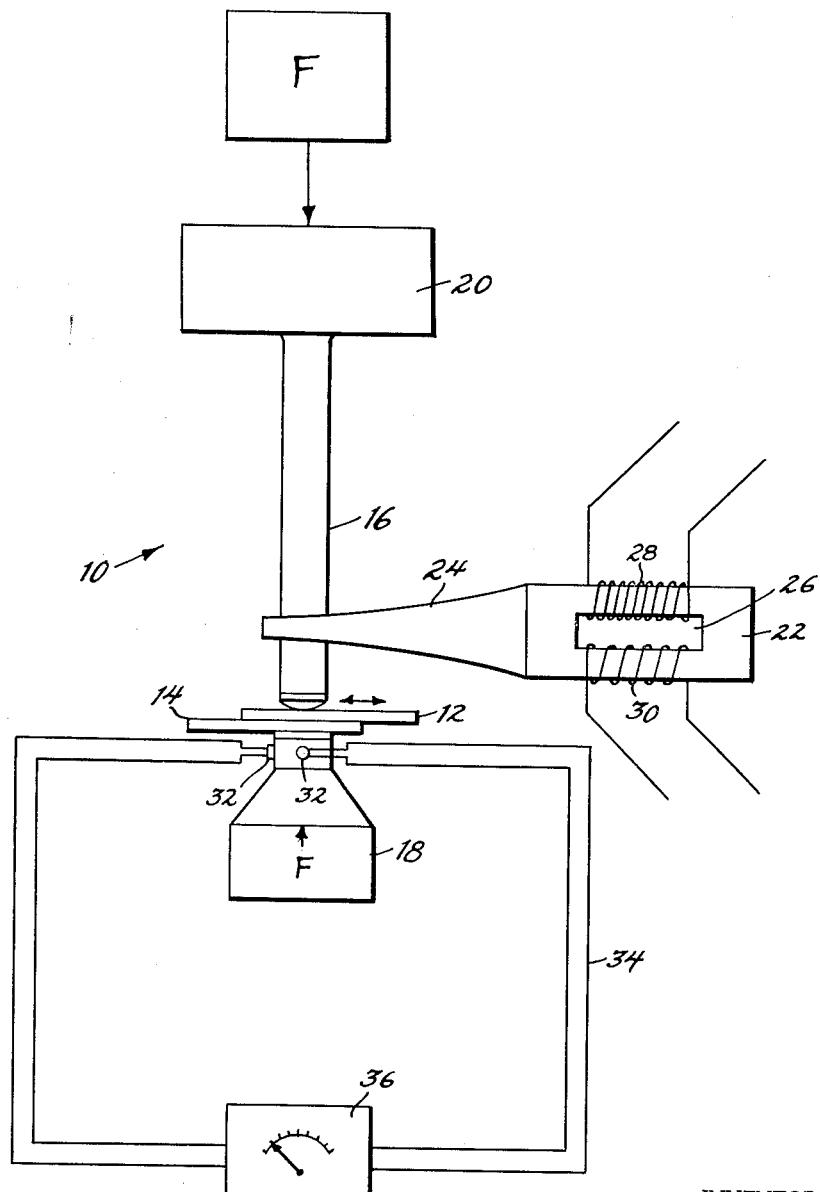
FIGURE 1 is an elevational view, partly in diagrammatic form, of an embodiment of the present invention.

Referring to the drawings, and initially to FIGURE 1, the welding apparatus of the present invention is designated generally as 10. The workpieces 12 and 14 are welded together in accordance with the process of the present invention intermediate the sonotrode 16 and the reflector anvil or support 18.

The sonotrode 16 in the embodiment of the present invention shown in FIGURE 1 comprises a cylindrical rod which is an acoustical reed of metal and which is restrained and supported cantilever-like by the mass 20 on the upper end thereof. The force necessary to maintain the workpieces 12 and 14 in regulated alignment and firm contact is designated diagrammatically as "F" and may be supplied in practice by suitable mechanical means which may consist of spring means, compressed air cylinder means, hydraulic cylinder means, and the like.

The reed-like sonotrode 16 is vibrated in flexure by means of the transducer 22 and the coupler member 24, which may comprise a tapered metallic element brazed or otherwise metallurgically secured in end-to-end engagement to transducer 22, and which encircles and is metallurgically joined, as by brazing, to a portion of the sonotrode 16 intermediate its ends.

The coupling member 24 may be, but need not necessarily be, tapered so as to satisfy the equation set forth at page 163 of Piezoelectric Crystals and Ultrasonics, by Warren P. Mason, published in 1950 by VanNostrand Company, namely a curved coupling member whose taper is an exponential function of its length and satisfies the equation:

$$S = S_0 e^{-2T1}$$

where S equals the original area, $S_0$ equals the reduced area, T equals the taper constant, and 1 equals the length of the tapered section.

The transducer 22 comprises a laminated core of nickel or other magnetostrictive metallic material, and may have a rectangularly shaped opening 26 in its center portion. A polarizing coil 28 and an excitation coil 30 may be wound through the rectangularly shaped opening 26 within the transducer 22. Upon variations of the magnetic field strength of the excitation coil 30, there will be produced concomitant variations in the dimension of the transducer 22, provided the polarizing coil 28 is charged at a suitable level with D.C. current, and that the frequency of the aforesaid variations namely the expansion and/or contraction of the magnetostrictive transducer 22 will be approximately equal to the frequency of the alternating electric current flowing in excitation coil 30.

In place of the transducer 22 shown in the drawings, other magnetostrictive materials such as the alloy 2–V Permendur (an iron-cobalt alloy), a nickel-iron alloy, or Alfenol (an aluminum-iron alloy), each of which should be properly dimentioned to insure axial resonance with the frequency of the alternating current applied thereto, so as to cause it to decrease or increase in length according to its coefficient of magnetostriction. Transducers of the aforesaid type constitute a preferred embodiment for operation at frequencies of up to about 75,000 cycles per second. In place of the aforesaid metallic magnetostrictive materials, the transducer may comprise almost any material which has good physical properties and which changes its physical dimensions under the influence of an electric potential. Thus, it may comprise a piezoelectric ceramic, such as barium titanate, or lead zirconate, or a natural piezoelectric material, such as quartz crystals. Such materials are preferably used at high frequency operations, as at frequencies above about 75,000 cycles per second. The transducer may also consist of ferroelectric materials or an electromagnetic device, such as that which actuates a radio loud-speaker.

The coupling system for conducting the vibratory energy from the transducer 22 to the workpieces 12 and 14 comprises the coupling member 24 and the sonotrode 16. The coupling system preferably should resonate at the transducer's operating frequency and should be insensitive to applied forces, so that the welding apparatus may operate efficiently under the welding process conditions and dispense vibratory energy via the vibrating jaw which engages the metals being welded without adverse effect upon the transducer-coupling system, such as stalling, or damping, or shifting of the resonant frequency of the transducer-coupling system.

In operation, the transducer 22 vibrates coupling member 24 which in turn vibrates the sonotrode 16 in the path indicated by the lower double-headed arrow in FIGURE 1. The vibratory movement of sonotrode 16 in flexure in the indicated direction effects welding between the workpieces 12 and 14.

The reflector anvil 18 may be fixedly secured in place. Reflector anvil 18 includes at least one microphone 32. Sometimes it is desirable to provide a plurality of microphones 32 disposed on its peripheral cylindrical surface. In the preferred embodiment which is illustrated in FIGURE 1 the microphones 32 are disposed along the circular periphery of the anvil 18 at an angle of ninety degrees in respect to each other. By the use of a pair of microphones so-disposed the sound energy in a plurality of directions may be detected. If more than two microphones are utilized, it is preferred that they should be evenly spaced about the periphery. For example, if three microphones are utilized, they are preferably spaced one hundred and twenty degrees apart, and if four microphones are utilized they are preferably spaced ninety degrees apart.

The microphones 32 should not be resonant at the frequency at which the welding apparatus 10 is operated. For example, utilizing a welding apparatus having a design resonant frequency of 15,700 cycles per second, microphones 32 having a resonant frequency of 400 kilocycles per second were utilized. Preferably, the microphones 32 should not be operating on a sharp peak but should be adjusted so that they operate away from a peak.

Any of a wide variety of conventional microphones may be utilized in the apparatus of the present invention. Excellent results have been obtained with conventional microphones comprising wafer discs of barium titanate three-eighths of an inch in diameter and one-eighth of an inch thick, with the major faces of such barium titanate disc being coated with silver foil. Any one of a wide variety of adhesives may be used for securing the microphones 32 to the periphery of the anvil 18. In particular, excellent results were obtained with so-called epoxy resin adhesives which comprise synthetic resins of the thermosetting type obtained by the condensation of phenol, acetone, and epichlorohydrin. The microphones 32 are connected by wires 34 to a sensitive voltmeter 36. For example, excellent results were obtained with a Hewlett-Packard Model 400D vacuum tube voltmeter which gave readings in root mean square volts. This voltmeter 36 enables the vibratory energy level coming through the weldment formed in the workpieces 12 and 14 to be monitored, with the higher the energy level being transmitted through the workpieces the better the tensile-strength characteristics of the weldment.

The voltmeter 36 may be arranged so that it indicates, as by an alarm or buzzer, when the energy level passing through weldments drops below a predetermined level. In this manner quality control of the weldments may be achieved in commercial installations. The subject invention is applicable to both spot weldments and seam weldments.

The welding process of the present invention is effected under a clamping force sufficient to hold the metals being welded in firm contact at the intended weld interface.

The clamping force may thus be varied over a very wide range. Thus, in a preferred embodiment of the present invention, the maximum clamping forces need not produce an external deformation [1] of more than about 10% in weldments effect at room or ambient temperatures. In many cases the extent of deformation is appreciably below 10% and in some instances may be virtually absent altogether. The minimal clamping force to be used in the process of our invention constitutes a force sufficient to maintain the metals being welded in regulated alignment and firm contact, e.g. contacting each other so that the weld may be effected by the application of vibratory energy.

The range of operative clamping pressures which may be employed in the process of the present invention may be readily ascertained by the user of the process. In all cases the clamping force must be sufficient to effect coupling between the metals being welded and the source of vibratory energy, so that such vibratory energy may be transmitted to the metals.

The operative range of vibratory welding frequencies which may be used in the process of the present invention includes frequencies within the range 59 to 300,000 cycles per second, with the preferred range constituting 400 to 75,000 cycles per second, and the optimum operating frequency range lying between about 5,000 and 40,000 cycles per second. This optimum range of operating frequencies may be readily achieved by transducer elements of known design, which are capable of generating elastic vibratory energy of high intensity.

Welding in accordance with the process of the present invention may be and in many instances is initiated at room temperatures or ambient temperatures without the

---

[1] By deformation is meant the change in dimensions of the weldment adjacent the weld zone divided by the aggregate thickness of the weldment members prior to welding; result multiplied by 100 to obtain percentage.

application of heat.[2] If desired, welding in accordance with the process of the present invention may also be initiated at elevated temperatures below the fusion temperature (melting point or solidus temperature of any of the pieces being bonded).[3] Thus, heating the metals to be welded prior to, and/or during welding to a temperature below their fusion temperature may, in some cases, facilitate the ease of welding and lower the power requirements and/or time requisite to achieve welding. The welding process of our invention is applicable to forming both spot and seam welds.

The welding process of the present invention may be applied to a wide variety of metals, examples of which include: pure aluminum to pure aluminum; aluminum alloy to aluminum alloy; copper to copper; brass to brass; magnesium alloy to magnesium alloy; nickel to nickel; stainless steel to stainless steel; silver-titanium alloy to silver-titanium alloy; gold-platinum alloy to stainless steel; platinum to copper; platinum to stainless steel; gold-platinum alloy to nickel; titanium alloy to titanium alloy; molybdenum to molybdenum; aluminum to nickel; stainless steel to copper alloy; nickel to copper alloy; nickel alloy to nickel alloy; sintered aluminum powder to sintered aluminum powder [4]; etc.

The spot-type welding process embodiment of the present invention may be accomplished within a wide time range, such as a time range of between about 0.001 second to about 6.0 seconds, or somewhat more, with welding under most normal conditions being effected during a time interval of from several hundredths of a second to several seconds.

The welding of most metals can be effected in accordance with the process of the present invention in the ambient atmosphere. However, the process of the present invention comprehends welding in highly evacuated atmospheres, or in selected atmospheres, such as atmospheres comprising an inert gas. Furthermore, while the welding process of the present invention may be effected with metals, such as aluminum, without the extensive precleaning required to effect satisfactory welding by other methods, a degree of precleaning and surface treatment may prove advantageous in the welding of many metals. It is desirable prior to effecting welding in accordance with the present invention to remove surface contaminants, such as hydrocarbon or other lubricants and the like.

Figure 2:
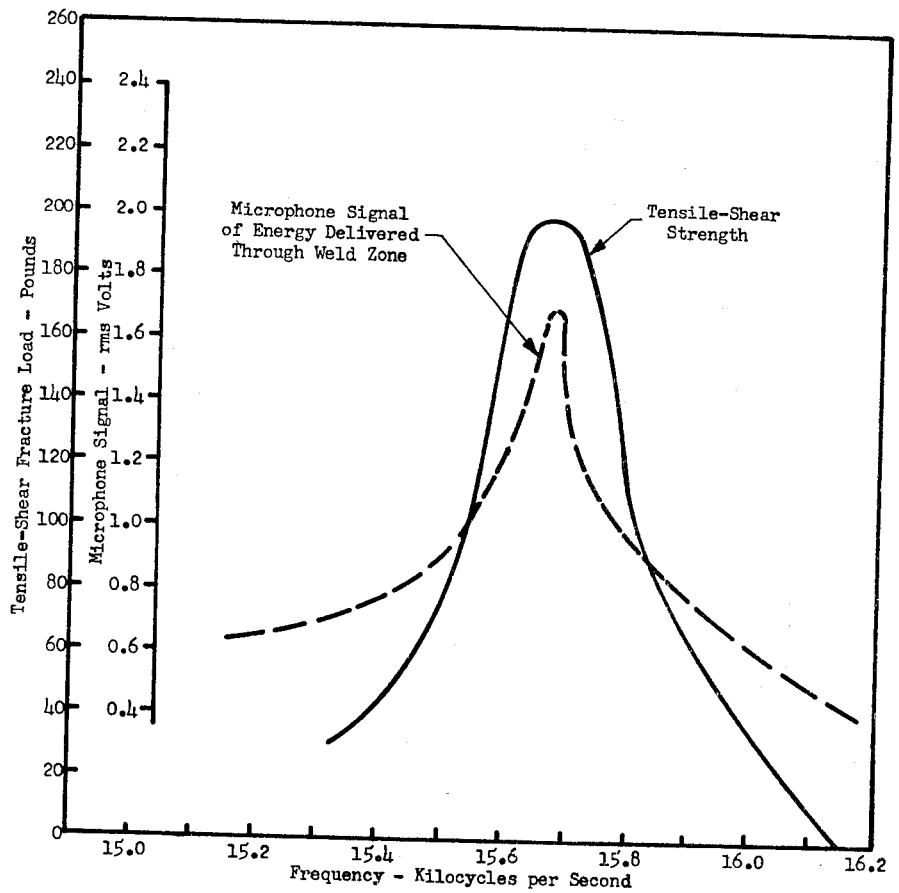
FIGURE 2 is a graph revealing the interrelation of tensile-shear strength and energy delivered through the weld zone in the vibratory welding of 0.032-inch 1100–H14 aluminum sheet metal.

In FIGURE 2 there is presented a pair of graphs derived from more than twenty-five individual weldments each of which was made between two 0.032 inch sheets of 1100–H14 aluminum. The apparatus used for these weldments is that shown in FIGURE 1. Each of the weldments was effected using a force of 165 pounds at room temperature. The apparatus was resonant at about 15,700 cycles per second and the input power to the transducer was varied between about 200 watts at 15,320 cycles per second to 210 watts at 16,150 cycles per second with the maximum input power being utilized in the region between 15,631 cycles per second and 15,743 cycles per second. The input power level was in all cases below the power level which would produce weldments which pulled nuggets when subjected to the tensile-shear characteristics test. As expected, the tensile-shear strength values for the weldments reflected the variations in the input power levels at the different frequencies, as seen by the graph in full line in FIGURE 2. This variation in weldment tensile-shear strength was accurately monitored by the microphone signal of energy delivered through the weld zone to the microphones 32 as shown by the broken line graph in FIGURE 2. In fact, the effect of the deviation from the resonant value of the welding system notwithstanding a substantially constant level of input power in the peak region of the curve was more accurately reflected by the microphone signal of energy level than by tensile-shear tests effected upon the weldment.

Figure 3:
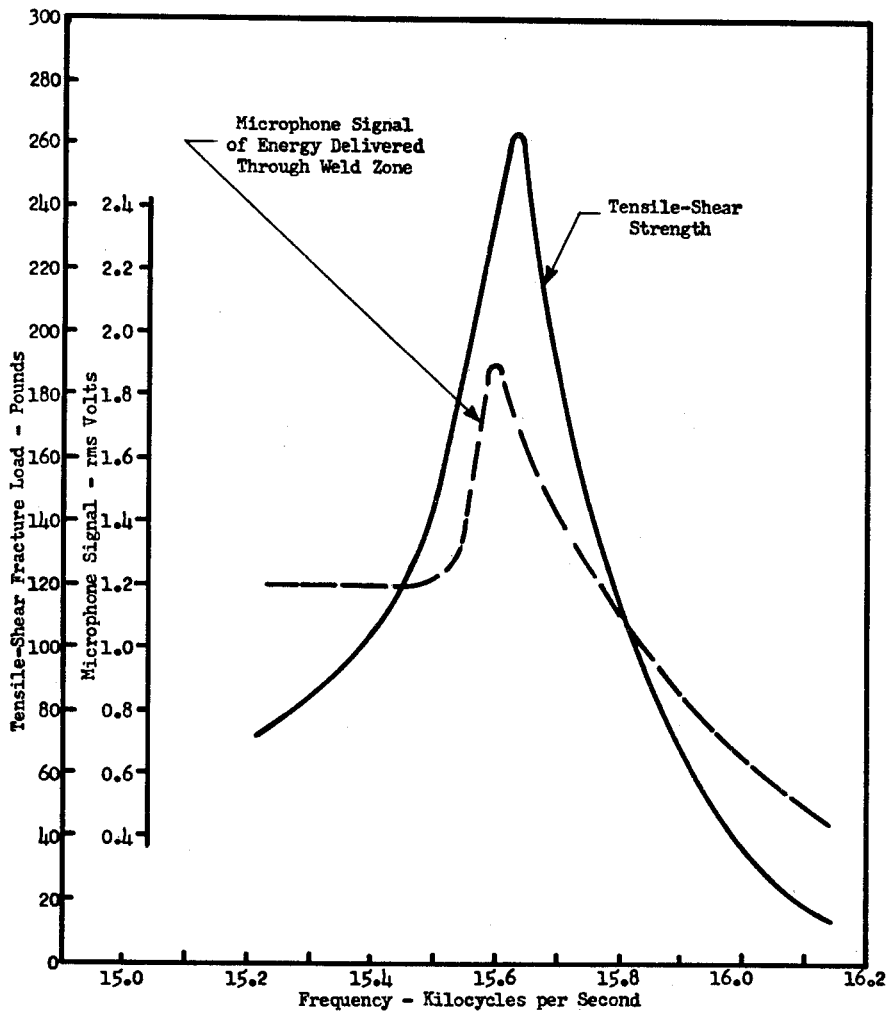
FIGURE 3 is a graph revealing the interrelation of tensile-shear strength and energy delivered through the weld zone in the vibratory welding of 0.040-inch 1100–H14 aluminum sheet metal.

Utilizing the same apparatus more than twenty-five weldments were prepared to form the graphs shown in FIGURE 3 which indicate the interrelation of tensile-shear strength and energy delivered through the weld zone in the vibratory welding of two sheets of 0.040 inch 1100-H14 aluminum sheet metal. Again the input power level was varied, at all times being below the input power level at which a weldment would be produced which would pull nuggets in the tensile-shear strength test. Thus, the input power level was varied between a low of 290 watts for a weldment at the frequency of 15,228 cycles per second and a high of 550 watts for six weldments within the range 15,615 cycles per second to 15,663 cycles per second, and a low of 270 watts at a frequency of 16,150 cycles per second. Again the microphone signal of energy delivered through the weld zone accurately reflected the tensile-shear strength characteristics of the weldment.

Figure 4:
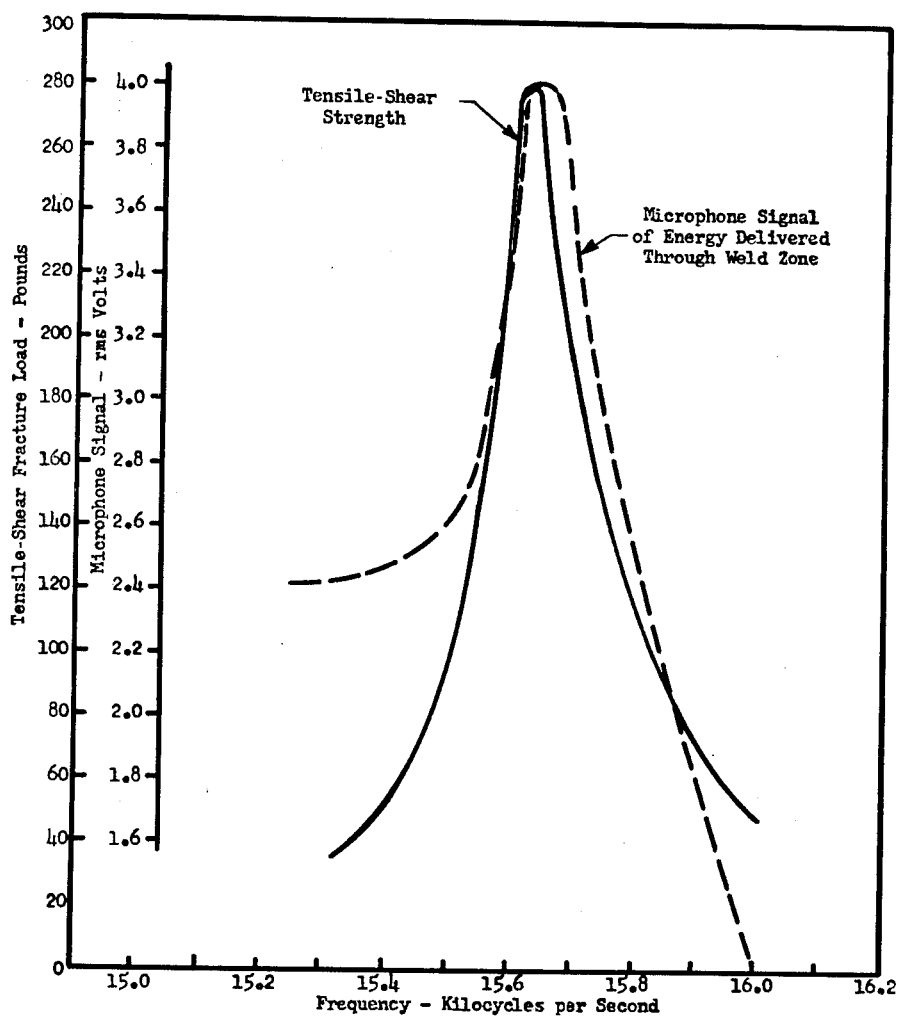
FIGURE 4 is a graph revealing the interrelation of tensile-shear strength and energy delivered through the weld zone in the vibratory welding of 0.064-inch 1100–H14 aluminum sheet metal.

The apparatus of FIGURE 1 was again utilized to form more than twenty-five weldments and reveal the interrelation of tensile-shear strength and energy delivered through the weld zone in the vibratory welding of two sheets of 0.064 inch 1100–H14 aluminum sheet metal, the results of which are plotted on FIGURE 4. The force used in the welding apparatus was 165 pounds, and the weldments were achieved at room temperature. The input power level was varied between a low of 290 watts at 15,453 cycles per second, a high of 560 watts for four weldments achieved at frequencies of between 15,631 cycles per second and 15,663 cycles per second, and a low of 310 watts at a frequency of 16,050 cycles per second. As before, in all cases these power levels are below those which will produce a weldment for these sheet metal thicknesses which will pull nuggets when tensile-shear strength tested. As before, the microphone signal of energy level delivered through the weld zone accurately reflected the tensile-shear strength characteristics of the weldments.

The present invention may be embodied in other specific forms without departing from the spirit or essential attributes thereof and, accordingly, reference should be made to the appended claims, rather than to the foregoing specification as indicated in the scope of the invention.

It is claimed:

1. Apparatus for non-fusion welding contacting metal members together comprising a vibration-transmitting member, means for impelling an end portion of said vibration-transmitting member against an outer face of one of said contacting metal members with a force in a direction and of a magnitude to hold the to-be-welded faces of the metal members in intimate contact at the intended weld zone and to couple mechanical vibratory energy into the intended weld zone, means for vibrating said end portion of said member at a frequency of between 59 and 300,000 cycles per second in a path substantially perpendicular to the direction of the applied force while such to-be-welded faces of the metal members are being held in intimate contact by engagement with said end portion of said member and a support means, with said vibrating means furnishing sufficient power so that the mechanical vibration delivered by said end portion in said path is at a sufficient energy level to weld the metal members together, and means secured to said support means for signaling the intensity of the vibratory energy transmitted through the metal members undergoing welding so that the quality of the weld being made may be ascertained by comparing the intensity of the vibratory energy of the signal with that developed at the resonant frequency of the vibrating means.

---

[2] The weldment may be warm to the touch after the weld due to the application of the elastic vibratory energy.
[3] The temperatures to which the foregoing statements refer are those which can be measured by burying diminutive thermocouples in the weld zone prior to welding, as well as the temperatures which can be estimated or approximated from a metallographic examination of a cross-section of a vibratory weld in the ordinary magnification range up to about 500 diameters.
[4] A mixture consisting of elemental aluminum and aluminum oxide.

2. Apparatus as set forth in claim 1 wherein said signaling means includes at least one microphone secured to the sides of said support means.

3. Apparatus as set forth in claim 2 wherein said microphone is resonant at a frequency other than said frequency of said vibrating means.

4. A welding device in accordance with claim 2 in which the support means comprises an anvil having a cylindrical upper portion, and in which two microphones are spaced about ninety degrees apart on the sides of said cylindrical upper portion, with means attached to said microphones for noting the energy level of the vibratory energy transmitted through the metal members undergoing welding.

5. A welding device in accordance with claim 1 in which the means engaged with the vibration-transmitting member for producing elastic vibration comprises a coupler secured to said vibration-transmitting member intermediate the ends of said vibration-transmitting member, and a magnetostrictive transducer secured in end-to-end relationship to said coupler.

6. A non-fusion method for welding metal members together which method comprises placing to-be-welded faces of the metal members together, applying a force to the metal members in a direction and of a magnitude to hold the contacting to-be-welded faces of the metal members in intimate contact at the intended weld zone and to couple mechanical vibratory energy into said zone, introducing through a vibrating element contacting one of the to-be-welded metal members mechanical vibration having a frequency of between 59 and 300,000 cycles per second to said one of said metal member faces, said mechanical vibration comprising a vibration component in a direction substantially perpendicular to the direction of applied force, and with a component being of an energy level sufficient to weld the metal members to each other, and detecting the intensity of the vibratory energy transmitted through the metal members undergoing welding so that the quality of the weld being made may be ascertained by comparing the intensity of the vibratory energy of the signal with that developed at the resonant frequency of the vibrating means.

7. A method in accordance with claim 6 wherein said detecting step includes the step of providing at least one microphone on a support for said metal members adjacent said weld zone.

8. A method in accordance with claim 7 wherein said detecting step also includes the step of operatively connecting said microphone to an indicator capable of emanating an ascertainable signal when the frequency of the energy transmitted through the metal members drops below a predetermined level.

9. A method in accordance with claim 6 in which the mechanical vibration has a frequency of between 5,000 and 40,000 cycles per second.

References Cited in the file of this patent

UNITED STATES PATENTS

| | | |
|---|---|---|
| 2,105,479 | Hayes | Jan. 18, 1938 |
| 2,235,928 | Hardinge | Mar. 25, 1941 |
| 2,736,090 | Sowter et al. | Feb. 28, 1956 |
| 2,946,119 | Jones et al. | July 26, 1960 |

OTHER REFERENCES

Product Engineering, October, 1947, Article on Supersonic Examination of Materials.